(12) United States Patent
Morris et al.

(10) Patent No.: US 6,275,493 B1
(45) Date of Patent: Aug. 14, 2001

(54) METHOD AND APPARATUS FOR CACHING SWITCHED VIRTUAL CIRCUITS IN AN ATM NETWORK

(75) Inventors: Todd Douglas Morris; Li Li; Kenneth Gary Hayward, all of Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/053,682

(22) Filed: Apr. 2, 1998

(51) Int. Cl.[7] .................................................. H04L 12/56
(52) U.S. Cl. .......................... 370/395; 370/352; 370/392; 370/397
(58) Field of Search ................................. 370/395, 397, 370/399, 236, 258, 401, 422, 244, 242, 355, 392, 218, 252, 232, 259, 429, 352; 709/236, 223, 238, 245, 224, 230, 310, 204

(56) References Cited

U.S. PATENT DOCUMENTS

| | | | |
|---|---|---|---|
| 5,333,131 | * 7/1994 | Tanabe et al. | 370/54 |
| 5,367,520 | * 11/1994 | Cordell | 370/60 |
| 5,453,979 | * 9/1995 | Schibler et al. | 370/60.1 |
| 5,463,621 | * 10/1995 | Suzuki | 370/60 |
| 5,528,592 | * 6/1996 | Schilbler et al. | 370/60.1 |
| 5,553,073 | * 9/1996 | Barraclough et al. | 370/85.5 |
| 5,719,863 | * 2/1998 | Hummel | 370/392 |
| 5,914,956 | * 6/1999 | Williams | 370/395 |
| 5,943,321 | * 8/1999 | St-Hilaire et al. | 370/259 |
| 5,991,306 | * 11/1999 | Burns et al. | 370/400 |
| 6,108,304 | * 8/2000 | Abe et al. | 370/232 |
| 6,122,252 | * 9/2000 | Aimoto et al. | 370/235 |

OTHER PUBLICATIONS

Document in the form of an Internet–Draft of Network Group from Demizu et al. dated Oct. 1997 relating to a VC pool to reduce the delays and costs of signaling.*

Document in the form of an Internet–Draft of Network Working Group from Demizu, et al dated Oct. 1997 relating to a VC pool to reduce the delays and costs of signaling.

* cited by examiner

Primary Examiner—Dang Ton
Assistant Examiner—Anthony Ton
(74) Attorney, Agent, or Firm—Max R. Wood; Swabey, Ogilvy, Renault

(57) ABSTRACT

A method and apparatus for pre-establishing and managing Switched Virtual Circuits (SVCs) and Switch Cross-Connects (XCs) to support rapid setup of real-time services in Asynchronous Transfer Mode (ATM) networks are described. SVCs and XCs are pre-established and cached in accordance with communications application-specific rules and maintenance algorithms for each destination and service characteristics in the backbone network. The intelligent management of cached SVCs and XCs permits the backbone network to meet the tight delay budget of delay-sensitive communication applications. With proper management of cached resources, connection setup can be rapidly effected even during periods of high demand. The advantage is a connection setup mechanism having adequate granularity to ensure both efficient network usage and rapid response to service requests.

28 Claims, 5 Drawing Sheets

METHOD AND APPARATUS FOR CACHING SWITCHED VIRTUAL CIRCUITS IN AN ATM NETWORK

TECHNICAL FIELD

This invention relates to the routing of real-time service requests through Asynchronous Transfer Mode (ATM) transport networks and, in particular, to the rapid establishment of a communications connection through an ATM network using cached switched virtual connections (SVCs) and ATM switching using cached cross-connections.

BACKGROUND OF THE INVENTION

In telecommunications systems, the current trend is to use an ATM protocol in the backbone transport network. The ATM protocol is based on a data structure called a "cell". Cells are data packets having a fixed length of 53 octets. Each cell includes a header of 5 octets and a payload of 48 octets. The header is used to direct the cell through the network and the payload is the useful information portion of each packet.

ATM cells are routed through the network using routing information in the cell header. The routing information consists of a Virtual Path Identifier (VPI) and a Virtual Channel Identifier (VCI). The VPI and VCI pair have only local significance on the link between ATM nodes. ATM nodes, which include ATM switches and cross-connect apparatus, use routing tables to map VCI and VPI values received in an incoming cell to outgoing values used to select an outgoing link as a way of routing the associated cell through the ATM node. A Virtual Circuit Link (VCL) is a logical link between two nodes in the ATM network and is identified by a VCI value. A Virtual Path Link (VPL) is a logical link between two nodes in the network and is identified by a VPI value. A Virtual Circuit Connection (VCC) is identified by a Virtual Circuit Connection Identifier (VCCI). The VCC is an end-to-end connection between two nodes in the network and is formed by the concatenation of VCLs.

When real-time connection-oriented traffic is transferred to an ATM transport backbone, a path must be set up through the backbone network to provide a connection over which cells are routed. Each communication request may also be associated with a service characteristic which may guarantee a specific bandwidth to a communication connection. One way to set up a path through the network is to define a VPC between each pair of ingress/egress points in the network. A VPC generally reserves adequate bandwidth to accommodate an anticipated traffic load for a specific communications application. The VPC eliminates most connection setup signaling and processing but tends to waste network resources because the VPC lacks the granularity required for efficient use of the network capacity.

Network capacity can be utilized more efficiently if a Switched Virtual Circuit (SVC) is used for each communication connection. However, it is well known that the signaling involved in setting up an SVC consumes a certain overhead in the network and may cause connection processing delays. For example, when voice traffic is transported over an ATM network, the setup of SVCs is known to sometimes cause unacceptable call setup delays. This problem is particularly acute during peak busy hours when ATM switches may not be able to sustain a peak time call setup rate.

Solutions have been invented to overcome this problem. For example, U.S. Pat. No. 5,719,863 which issued Feb. 17, 1998 to Hummel describes a method and arrangement for fast through-connect of virtual connections in ATM communication systems. Hummel proposes that virtual connections be set up using cells containing call-associated signaling information. The signaling information is communicated using cells defined as administration and maintenance cells. A permanent virtual connection is set up from an originating to a destination ATM communication terminal equipment. Cells containing the signaling information are labelled as administration and maintenance cells. They are transmitted via the permanent virtual connection. Using the permanent virtual connection for setting up SVCs facilitates and accelerates SVC setup. A drawback of this solution is that a certain portion of the network bandwidth is reserved exclusively for signaling and that portion of the network cannot be used for other purposes even when signaling requirements are minimal. A further disadvantage is that SVC setup still takes time and uses resources in every node involved in the connection.

SUMMARY OF THE INVENTION

It is therefore an object of the invention to provide a method and apparatus for rapidly establishing communications connections through an ATM network which ensures minimal delay in the setup of communications connections while ensuring efficient usage of network capacity.

It is another object of the invention to provide a method and apparatus for rapidly establishing cross-connections through an ATM switch which ensures minimal delay in the setup of cross-connections while ensuring efficient usage of switch capacity.

It is a further object of the invention to provide a method and apparatus for establishing a communications connection through an ATM network which permits the caching of SVCs.

It is another object of the invention to provide a method and apparatus for establishing a cross-connection through an ATM switch which permits the caching of cross-connections.

It is yet a further object of the invention to provide a method and apparatus for rapidly establishing a communications connection through an ATM network which permits the intelligent caching of SVCs using application-specific parameters.

It is yet another object of the invention to provide a method and apparatus for rapidly establishing a cross-connection through an ATM switch which permits an intelligent caching of cross-connections using application-specific parameters.

It is yet a further object of the invention to provide a method and apparatus for rapidly establishing a communications connection through an ATM network which proactively responds to the level of use of an ATM network by any given real-time communications application to ensure that network resources are efficiently utilized.

It is yet another object of the invention to provide a method and apparatus for rapidly establishing a cross-connection through an ATM switch that proactively responds to the level of usage of the switch fabric by any communications application to ensure that switch resources are efficiently utilized.

These and other objects of the invention are realized in a method of rapidly establishing a communications connection through an asynchronous transfer mode (ATM) network, comprising the steps of:

a) setting up at least one switched virtual circuit connection (SVC) between a first and second ingress/egress point in the ATM network;

b) caching the at least one SVC for use by either the first or second ingress/egress points when a request for a communications connection through the ATM network is received by one of the ingress/egress points;

c) selecting an appropriate one of the at least one cached SVCs when the request for a communications connection through the ATM network is received by one of the ingress/egress points, if an appropriate cached SVC is available; and d) using the cached SVC to rapidly establish the communications connection through the ATM network.

The invention is practised using an apparatus for rapidly establishing a communications connection through an asynchronous transfer mode (ATM) network, comprising at least one machine programmed to perform the functions of:

a) a switched virtual circuit connection (SVC) control agent which is responsible for SVC setup and release at an ingress/egress point for the ATM network;

b) an SVC caching manager that maintains an SVC cache table in which a record of each cached SVC is stored; and c) an SVC selector that processes operation requests from a communications application which seeks to establish an SVC through the ATM network, or release an SVC that is no longer required, the SVC selector selecting an available cached SVC from the SVC cache table or requesting the SVC control agent to establish a new SVC through the network when a process operation request is received from the communications application.

In accordance with a further aspect of the invention there is provided a method of rapidly establishing a cross-connection through an asynchronous transfer mode (ATM) switch, comprising the steps of:

a) setting up at least one cross-connection (XC) between an ingress port and an egress port in the ATM switch;

b) caching the at least one XC for use by the ingress port when a request for a cross-connection through the ATM switch is received;

c) selecting a one of the at least one cached XCs when the request for a cross-connection through the ATM switch is received; and d) using the selected XC to rapidly establish the cross-connection through the ATM switch.

This further aspect of the invention is practised using apparatus for rapidly establishing a cross-connection through an asynchronous transfer mode (ATM) switch, comprising an ATM switch control element programmed to perform the functions of:

a) a cross-connect (XC) control agent which is responsible for XC set up and release in the ATM switch;

b) a cross-connect caching manager which maintains an XC cache table in which a record of each cached XC is stored; and c) a cross-connect selector which processes operation requests that seek to establish an XC through the ATM switch, or release an XC that is no longer required, the cross-connect selector selecting an available cached XC from the XC cache table or requesting the cross-connect control agent to establish a new XC through the switch when a process operation request is received.

The apparatus and the methods in accordance with the invention provide a mechanism for rapidly establishing communications connections through an ATM network while ensuring that the resources of the ATM network are efficiently utilized. In accordance with the method, SVCs are set up between a first and second ingress/egress point in the ATM network and the SVCs are cached for later use by the network so that network resources are not required for SVC setup. This ensures that real-time services can be switched through the ATM network with a minimum of delay. It also ensures that network resources are efficiently used since signaling overhead is minimized.

In accordance with a preferred embodiment of the invention, the cache of SVCs is managed by software which monitors SVC usage and adds SVCs to, or removes SVCs from, the cache as demand for service by a specific application increases or decreases. In accordance with the preferred embodiment of the invention, SVCs are established and maintained in accordance with the characteristics of the service offered by the communications application. The SVC caches are therefore preferably maintained by service characteristic as well as by application.

In order to further speed up SVC setup, cross-connections (XCs) can also be cached in ATM network nodes. The same control objects and algorithms may be used for SVC and XC caching. When XCs are cached, new SVCs can be set up through the ATM network with minimal delay, thus further reducing call setup time.

Since the use of caching is parameter-driven, a communications application is not obligated to use SVC caching. This enables flexible use of the apparatus in accordance with the invention and permits network managers to manage the network in accordance with their needs and/or management strategies.

BRIEF DESCRIPTION OF THE DRAWINGS

The invention will now be further explained by way of example only and with reference to the following drawings in which.

DETAILED DESCRIPTION OF THE PREFERRED EMBODIMENT

Figure 1:
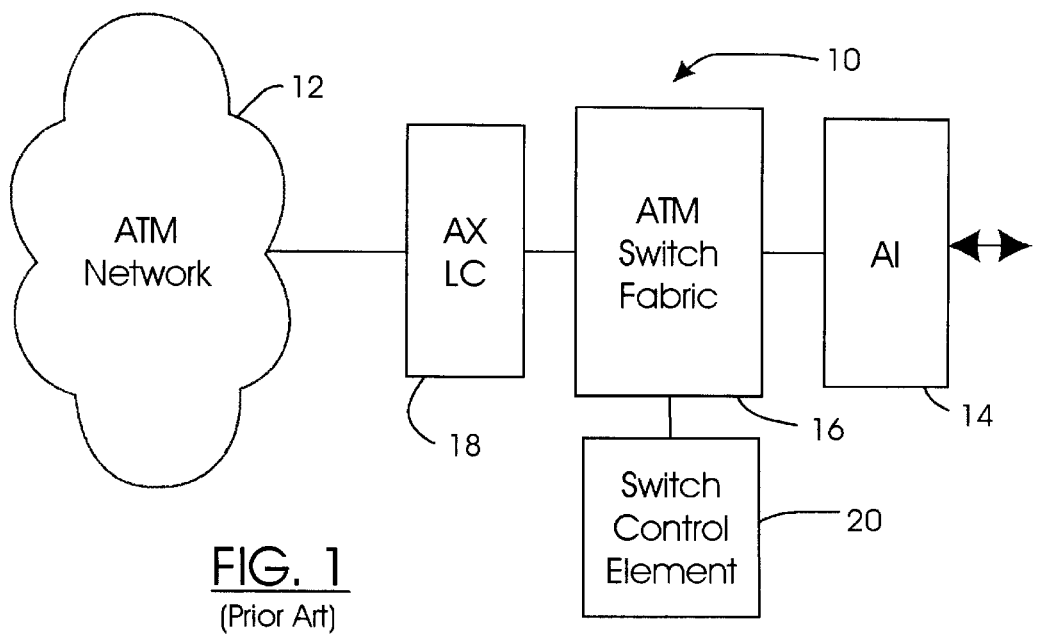
FIG. 1 is a schematic diagram of a prior art ingress/egress node in an ATM network.

FIG. 1 shows one prior art arrangement for an ingress/egress point, generally indicated by the reference 10, in an asynchronous transfer mode (ATM) network 12. Many other functionally equivalent arrangements for ATM network ingress/egress points are also known. The ingress/egress point includes at least one application interface 14. The application interface may be any one of a number of devices, including: ATM line cards in the trunk side of a Service Switching Point (SSP) in a synchronous transfer mode (STM) switched telephone network (STN); an STM tandem peripheral which serves as a gateway between the STN and the ATM network; an IP router or an IP host with an ATM Network Interface Card (NIC). Those skilled in the art will understand that this list is not an exhaustive list of application interfaces. The application interface 14 is connected to an ATM switch fabric 16 which is well known in the art. Connected to the ATM network side of the ATM switch fabric 16 are a plurality of auxiliary cross-connect line cards 18, also well known in the art. The ATM switch fabric 16 is controlled by a switch control element 20, which handles ATM signaling, routing and switch fabric resource management, as is well known in the art. The ATM network 12 is typically used as a backbone network for a number of different communications services. The ATM network 12 typically serves as a transport for a variety of real-time communications services which are delay sensitive, as well as a variety of data communications services which are delay tolerant. When real-time communications are transported through the ATM network, it is important that setup delays be minimized in order to ensure that excessive call setup delays are avoided and peak-hour call setup rates can be sustained.

Figure 2:
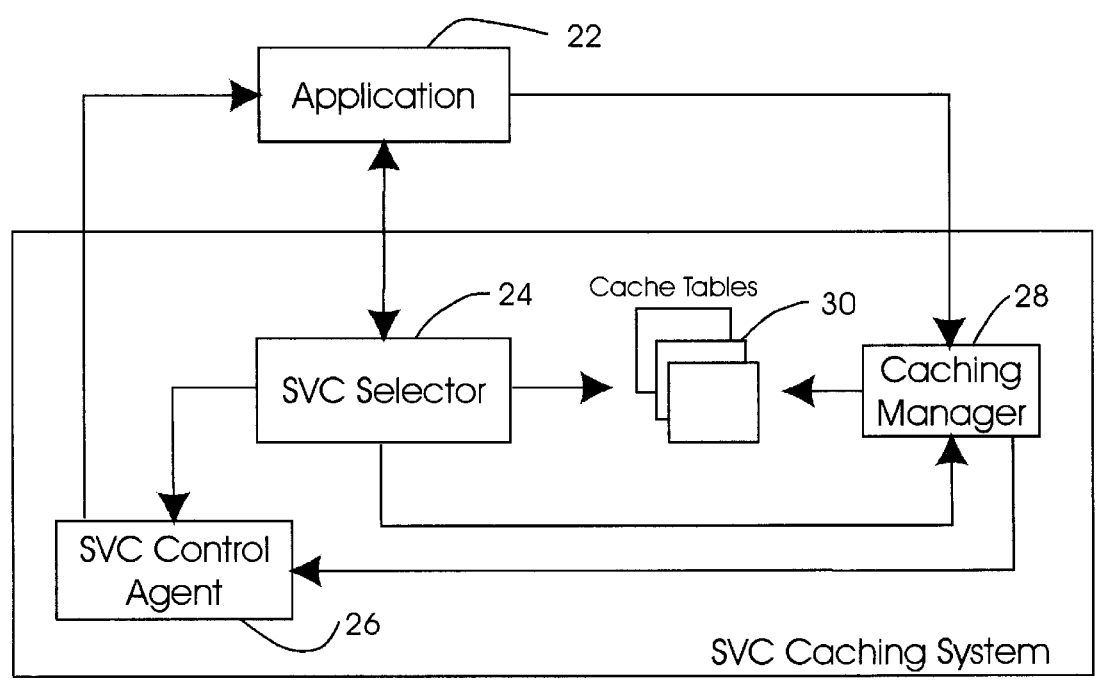
FIG. 2 is a block diagram showing the principal components of the apparatus for SVC caching in accordance with the invention.

FIG. 2 is a block diagram of the functional components for switched virtual circuit (SVC) caching in accordance with the invention. A communications application 22 associated with the communications application interface 14 communicates with the functional components of the SVC caching system in accordance with the invention using an appropriate communications protocol. The SVC caching system in accordance with the invention includes an SVC selector 24, an SVC control agent 26, a caching manager 28 and a plurality of cache tables 30 maintained by the caching manager 28. The SVC selector 24, the SVC control agent 26 and the caching manager 28 may be functional components of a single computer program or may be substantially independent software modules or software objects that execute on one or more computer controlled machines.

The SVC selector 24 serves as an interface between the application 22 and the SVC control agent 26. The SVC selector 24 is responsible for filtering SVC operation requests for the setup and release of SVCs from the application 22. The SVC selector 24 determines if an SVC is to be taken from a cache table 30 on receipt of an SVC setup request or is to be set up on demand, as will be explained below with relation to FIGS. 3–5.

The SVC control agent 26 is responsible for SVC setup and release. Each of the SVC selector 24 and the caching manager 28 may request the SVC control agent 26 to perform an SVC operation such as the setup or release of an SVC. The SVC control agent 26 also communicates with the communications application 22 to inform the communications application 22 when an SVC is released if the communications application 22 requires such information, as will also be explained below with reference to FIGS. 3–5.

The caching manager 28 is responsible for maintaining the SVC cache tables 30 to ensure that an appropriate number of cached SVCs are available for the rapid establishment of communications connections. The caching manager 28 is advised by the SVC selector 24 when a release request is received from the communications application 22, and the caching manager executes a management-defined algorithm to determine whether that SVC should be kept in the cache tables or deleted from the cache tables and released back through the ATM network 12. When an SVC is released from another ingress/egress point 10 in the ATM network 12, the SVC control agent 26 will inform the communications application 22 that an SVC belonging to the application has been released. The communications application may directly inform the caching manager 28 of the SVC release. On receipt of the SVC release notice, the caching manager 28 deletes the SVC entry from its cache tables. The function of the caching manager 28 is to ensure that just enough cached SVCs are available to handle delay-sensitive traffic without the over-reservation of bandwidth in the ATM network 12.

Overview of System Operations

Preferably the SVC caching system in accordance with the invention may be configured by network administration to operate in accordance with the requirements of a specific communications application. In general, however, the SVC system in accordance with the preferred embodiment of the invention operates as follows. When an SVC is requested by the communications application 22, the SVC selector examines an SVC cache policy (rule base) associated with the application to determine whether the communications application 22 uses SVC caching. If SVC caching is used by the application 22, the SVC selector examines a cache table 30 associated with the application 22 for an appropriate, unoccupied SVC, as will be explained below with reference to FIGS. 3–5. If the selection is successful, the SVC is acquired by the SVC selector 24 which changes the status of the SVC to indicate that it is occupied and an identifier (VCCI) for the SVC is returned to the requesting communications application 22. If all of the SVCs available in the cache are occupied, the SVC selector generates an SVC setup request to the SVC control agent 26 to request that a new SVC be set up through the ATM network 12. After the SVC control agent 26 sets up the SVC, the SVC is passed by the SVC selector 24 to the communications application 22 and to the caching manager 28. The caching manager 28 executes its caching algorithm to determine whether the SVC should be added to the cache table.

When an SVC release request is received from the communications application 22, the SVC selector 24 checks the communications applications caching policy (rule base) to determine if the SVC release request should be passed to the caching manager 28, or passed directly to the SVC control agent 26. If the caching policy indicates that caching is used by the communications application 22, the SVC release request is passed to the caching manager 28. The caching manager 28, on receipt of the release request, executes the caching algorithm for the communications application 22 to determine whether the SVC should be cached or released through the network. The caching algorithm may likewise indicate that only a portion of the SVC is to be released. As will be explained below, it is often advantageous to release only the cross-connect at the ATM switch fabric 16 (FIG. 1) while maintaining the SVC between auxiliary line cards 18. This enables more flexibility for use of the SVC since the SVC is no longer linked to a particular port in the application interface 14. In other instances, there may be sufficient traffic to warrant that the cross-connect is maintained at the application interface 14. If the communications application 22 does not use SVC caching, the SVC selector 24 passes the release request directly to the SVC control agent 26 which releases the SVC through the ATM network 12 in a manner well known in the art. A release indication can then be sent back to the communications application 22, if the communications application 22 requires it.

If an SVC setup request is received in an ATM signaling message from a remote ingress/egress point 10 in the ATM network 12, the communications application 22 is informed of the request by the SVC control agent 26. The communications application 22 may accept the request. In that case, an ATM signaling CONNECT message is sent back through the ATM network 12 to the remote communications application. The communications application 22 may then directly or indirectly inform the caching manager that a new SVC has been set up. When a new SVC setup indication is received by the caching manager 28, the caching manager 28 executes its caching algorithm for the communications application 22 as described above to determine if the SVC is to be added to a cache table 30. As noted above, it is preferable that the caching algorithm be parameter-driven so that it may be defined or changed by network administration to best satisfy the requirements of each communications application 22.

Selection Index and Caching Algorithm

A selection index and a caching algorithm must be defined for each communications application 22 which use SVC caching in accordance with the invention. The selection index stores information required by the SVC selector 24 for retrieving cached SVCs from the cache tables 30. The selection index is defined in accordance with the requirements of each communications application 22 to permit the SVC selector 24 to locate and retrieve an SVC appropriate for a communications connection being requested by the communications application 22. Selection index data is passed to the SVC selector 24 in accordance with the selection index when the communications application 22 requests an SVC. The selection index data is communications application-specific and must be predefined before caching for a communications application 22 is enabled.

As explained above, the caching algorithm is likewise preferably user-definable. The caching algorithm may be very simple or very complex depending on the requirements of a particular communications application 22. For example, the caching algorithm may permit caching to be governed in complex ways using variables such as time of day, day of week, etc. On the other hand, a simple algorithm may prove equally efficient depending on the anticipated burstiness of traffic experienced by the communications application 22. The purpose of the caching algorithm is to permit the caching manager 28 to determine when an SVC is to be added to, or removed from, the cache tables 30.

Those skilled in the art will understand that the tables on each end of a cached SVC should be synchronized in order to avoid network instability. One method for ensuring synchronization is to enable signaling between the peer caching managers so that when one end has cached an SVC the peer manager is informed to ensure that the same SVC is cached on the opposite end of the connection. Such peer-to-peer signaling can be accomplished in a variety of ways and the signaling is not a part of this invention. A simpler approach is to use a consistent policy for all caching managers in the ATM network 12. In the simple approach, whenever an SVC is created, it is added to the cache table regardless of whether it was created by the local application or by the remote end. Whenever a caching manager 28 determines that an SVC should be deleted from the caching tables 30, the opposite end will also delete the SVC because a RELEASE message is received via ATM signaling on the opposite end of the SVC.

An example of a simple SVC caching algorithm that is adaptive to traffic fluctuations in the network is set forth below in pseudocode. In the example, "X" represents an integer which indicates a number of SVCs that are to be kept in reserve for a communications application. "Y" represents a number which defines a period in seconds during which an SVC may remain unused before it is deleted from the cache table to free the network resource it reserves for other communications applications. Both X and Y are preferably application-specific variables which may be changed as required by network administration.

{IF an SVC setup indication received,
    write SVC in cache table;
IF a communications application release request received,
    IF number of available SVCs in cache table ≦ X
        {check application policy rule for cached SVCs (e.g. release local cross-connect or exit)
        };
    ELSE request SVC control agent to release SVC;
IF SVC release indication received,
    Delete SVC entry in cache table;
IF cached SVC unused for Y seconds,
    {Request SVC control agent to release SVC,
    Delete SVC entry from cache table
    }
}

As described above, it will be understood by those skilled in the art that many other algorithms may be used to manage network resource use by a communications application. Any parameter which may be used to predict and adapt to traffic fluctuations may be incorporated into a caching algorithm.

System Initialization

Initialization of the caching system in accordance with the invention is dependent to a certain extent on the caching algorithm used by the caching manager 28 for a particular communications application 22. If a simple self-maintaining algorithm such as set forth above is utilized, no initialization of the caching tables 30 is required since the algorithm will ensure that the caching manager 28 enters and maintains a required number of SVCs in the communication Happlication's cache table.

It may alternatively be necessary or desirable for a network operator to study and measure traffic patterns in the network beforehand to estimate a required number of SVCs for a communications application 22 between each pair of ingress/egress points in the ATM network 20. Once the study is completed, the operator can request the SVC selector 24 to pre-establish a certain number of SVCs between each pair of ingress/egress points in the ATM network. The caching manager 28 will be informed by the SVC selector 24 about the establishment of the new SVCs. The newly established SVCs will be added by the caching manager 28 to the cache table for the communications application 22.

In any implementation, it is important that peer caching managers at each ingress/egress pair in the ATM network have all caching algorithm variables synchronized in order to avoid instability in the network. If an algorithm as described above which utilizes a time-out variable for controlling the number of SVCs in the caching table is operative in the network, it is desirable that the caching manager report to network operators when a cache deletion is caused by the time-out condition. This permits network operators to tune the caching algorithm to more properly suit the communications application.

Examples of Using SVC Caching

Figure 3:
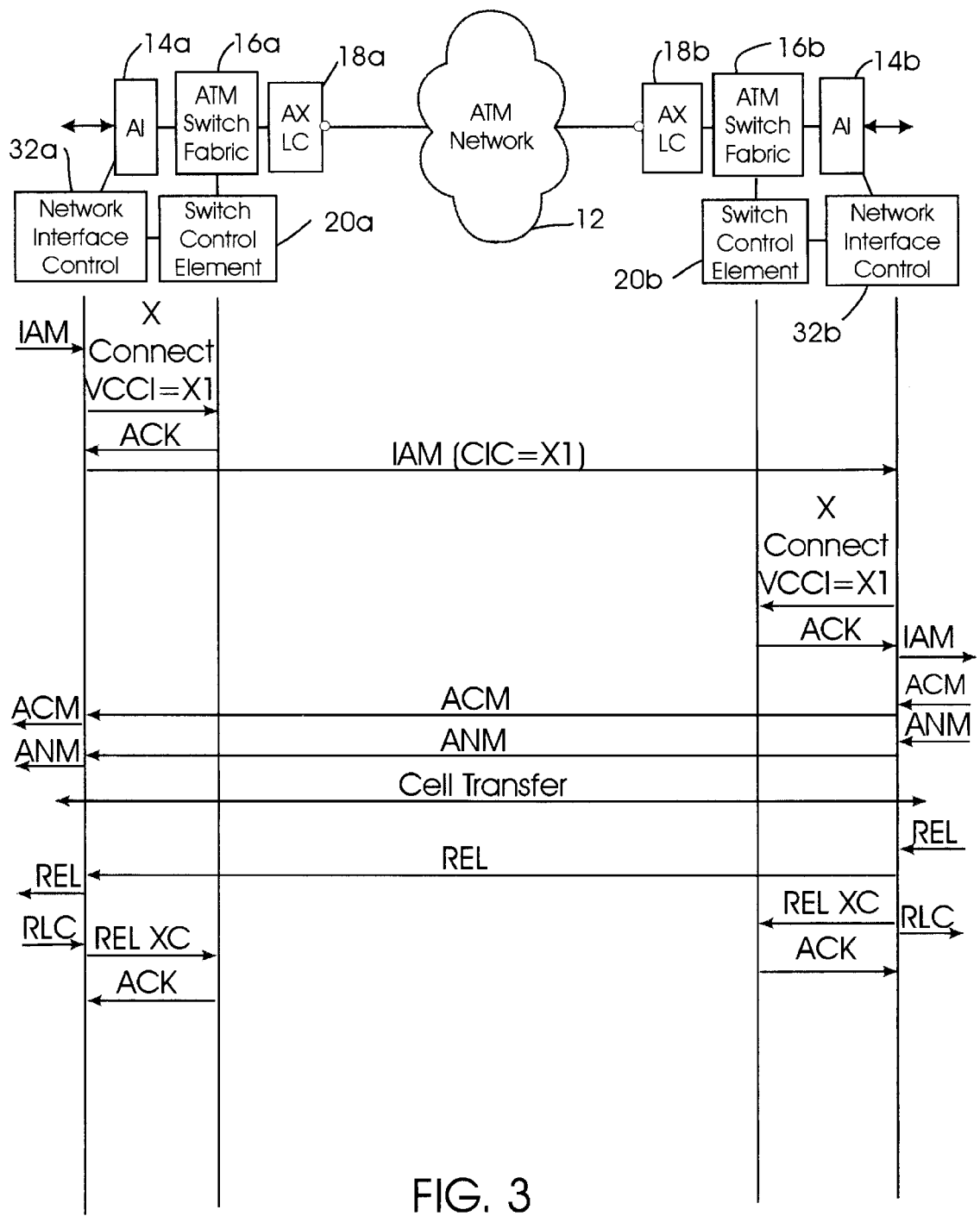
FIG. 3 is a schematic diagram of a call setup and call release message flow using the methods and apparatus in accordance with the invention, in which a cached SVC is used for the call and returned to the cache after call release.
Figure 4:
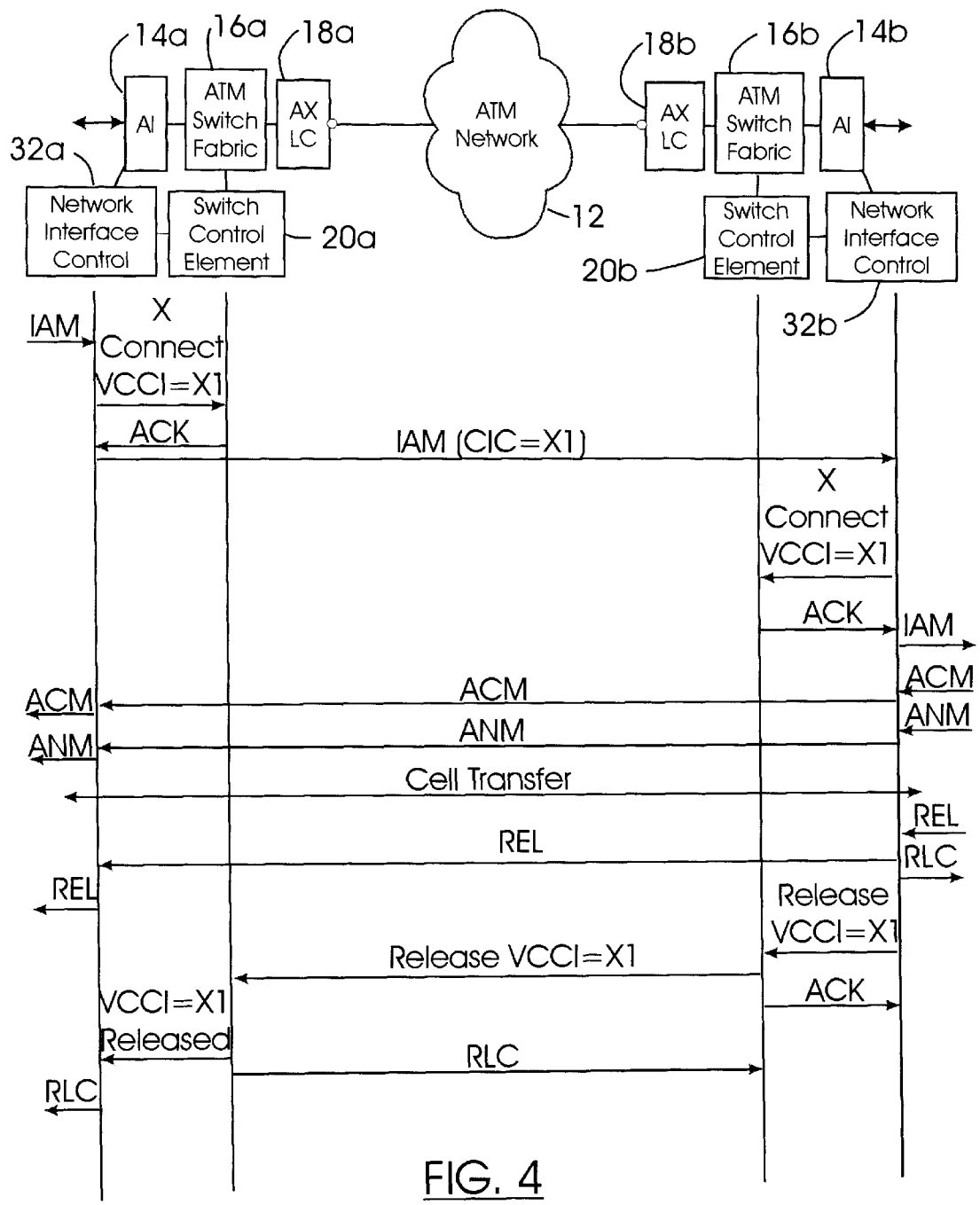
FIG. 4 is a schematic diagram of a call setup and call release message flow using the methods and apparatus in accordance with the invention, in which a cached SVC is used for a call and deleted from the cache after the call is released.
Figure 5:
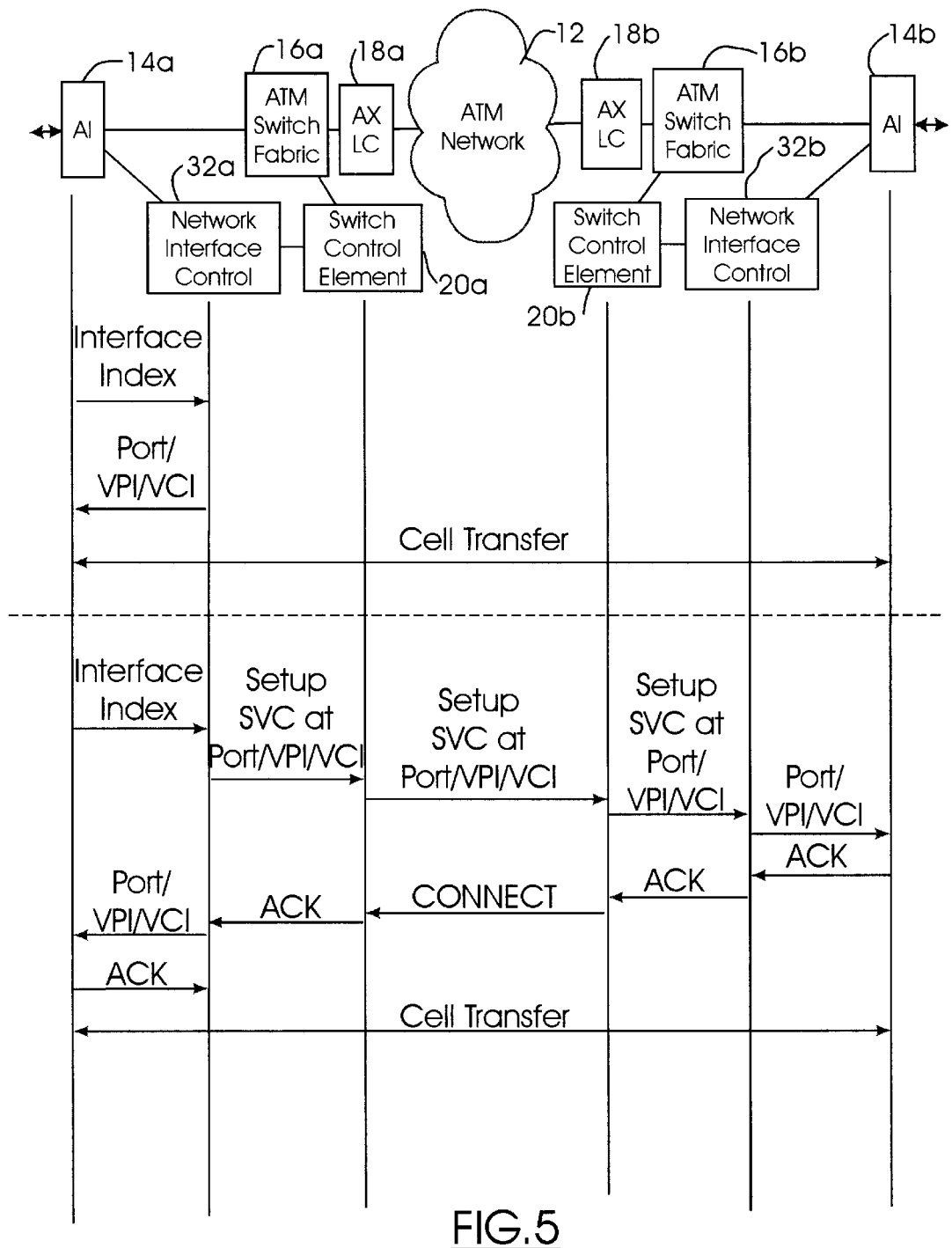
FIG. 5 is a schematic diagram showing two examples of a message flow using the apparatus in accordance with the invention to route Internet Protocol messages over ATM.

FIGS. 3–5 schematically illustrate examples of using SVC caching in the ATM network 12. FIGS. 3 and 4 illustrate the use of SVC caching for voice traffic over an ATM backbone. FIG. 5 shows system operation for the transport of Internet Protocol (IP) over an ATM backbone. In the examples illustrated in FIGS. 3–5, each ingress/egress point in the ATM network 12 is shown to consist of an application interface 14a,b; ATM switch fabric 16a,b; auxiliary line cards 18a,b; a switch control element 20a,b and a network interface control 32a,b. Those skilled in the art will understand that many other configurations for ATM gateways are used. For simplicity in illustrating message flows, it is assumed that all SVC caching system components reside on the network interface control 32a,b. In actual practice, the functions of the network interface control may be distributed among other network elements. In practice, the switch control elements 20a,b may serve as the SVC control agent 26 and the SVC selector 24 and caching manager 28 may be incorporated into the functionality of the application interfaces 14a,b. The examples described below are therefore not intended to encompass all practical implementations of the caching methods and apparatus described.

EXAMPLE 1

FIG. 3 shows the call setup and release for a voice connection through the ATM network 12 in which a cached SVC is used for the connection. In this example, an Integrated Services Digital Network User Part (ISUP) Initial Address Message (IAM) is received by a network interface control element 32 via a signaling system (for example a Signaling System 7 (SS7) network utilized by the switched telephone network from which the call originated). The SS7 message may be passed from the application interface 14 to the network interface control 32. In some installations, the network interface control 32 may receive the IAM directly. In either instance, the network interface control 32 passes the IAM communications request to the SVC selector 24 (FIG. 2). The SVC selector 24 consults the policy (rule base) associated with the communications application 22 to determine whether SVC caching is used by the application. In this example, SVC caching is used by the communications application 22. Consequently, the SVC selector extracts information from the IAM and processes the information to construct selection index data to permit a cached SVC to be retrieved from a cache table 30 reserved for use by the communications application 22. Alternatively, the SVC selector 24 receives selection index data from the network interface control 32 to permit a cached SVC to be retrieved from a cache table 30. The selection index data includes a destination Point Code (PC) of an SSP in a switched telephone network associated with the destination ATM switch for the call. The destination PC is derived, for example, from translation tables using the dialed number from the IAM. The selection index data will also typically include an ATM destination switch prefix and a service characteristic (Class of Service, traffic contract, quality of service, etc.) which determines the attributes of the SVC to be used for the call. Table 1 illustrates an exemplary record format for a cache table organized by destination PC. As will be understood by those skilled in the art, other cache table record formats may function equally well. As will be further understood, more or less information may be stored in a cache table, as required by a particular application.

TABLE 1

| Destination Point Code | Destination ATM switch prefix | Service Characteristics | VCCI | Status |
|---|---|---|---|---|
| P2 | AESA1 | DS0/CBR | X1 | 0 |
| P3 | AESA2 | DS0/CBR | X2 | 1 |
| ... | ... | ... | ... | ... |

In Table 1, the primary search index is the destination point code and destination ATM switch prefix for the voice call. The status of the VCCI is used by the SVC selector to determine whether the VCCI is occupied or available. In this example, a status of 0 indicates that the VCCI is available and a status of 1 indicates that it is occupied. The CoS passed to the SVC selector 24 is used to determine whether the connection characteristics of the VCCI meet the requirements of the communications application 22.

In this example, the SVC selector determines that the VCCI "X1" terminates at the desired point code (P2) and destination ATM switch prefix and provides the required CoS (DS0/CBR). The SVC selector 24 therefore reserves the VCCI X1 by changing status from 0 to 1 and passes the VCCI X1 back to the application interface 14. When the SVC selector consulted the communications application policy (rule base) as described above, it determined that local cross-connects were disconnected when SVCs were cached for this communications application. As shown in FIG. 3, the SVC selector 24 therefore requests the SVC control agent 26 to cross-connect from the incoming port on the application interface 14 to an outgoing port (VCCI=X1 on the auxiliary line card 18). The SVC selector 24 then passes the VCCI=X to the network interface control which replaces the Circuit Identification Code (CIC) in the IAM with the VCCI X1. The network interface control 32 forwards the IAM over its signaling network to its peer network interface control 32b at the destination ingress/egress point of the network.

On receipt of the IAM, the network interface control 32b preferably requests the SVC selector 24 to verify that there is a corresponding SVC for the call before requesting the local SVC control agent 26 to effect the cross-connect to VCCI X1. Verification may be completed using a cache table 30 organized by originating Point Code, such as Table 2 shown below.

TABLE 2

| Originating Point Code | Originating ATM switch address prefix | Service Characteristics | VCCI | Status |
|---|---|---|---|---|
| P1 | AESA1 | DS0/CBR | X1 | 0 |
| ... | ... | DS0/CBR | ... | 1 |
| | | ... | | ... |

After the SVC selector 24 has verified that the VCCI X1 exists, it passes a request to the switch control element 32b to cross-connect the VCCI X1 from the auxiliary line card 18b to the application interface 14b. Cross-connect information may be retrieved from a cache table such as Table 3.

TABLE 3

| Originating Point Code | Remote ATM switch address prefix | VCCI | Incoming port/vpi/vci |
|---|---|---|---|
| P1 | AESA1 | X1 | C1/vp1/vc150 |
| P2 | AESA2 | X2 | C2/vp2/vc136 |

In response to the cross-connect request, the switch control element 32b downloads the cross-connect between the incoming VPI/VCI and an appropriate outgoing DS0 0 trunk at the application interface 14b. The network interface control 32b then forwards the IAM to the gateway SSP in the terminating switched telephone network which returns an Address Complete Message (ACM) followed by an Answer Message (ANM) in accordance with SS7 messaging protocol. Thereafter, cell transfer proceeds as voice data is transported across the ATM network 12.

When the voice communication is completed, the called party, for example, goes on hook which initiates a release (REL) message from the terminating switched telephone network. The REL message is received by the network interface control 32b. The network interface control 32b returns a Release Complete (RLC) to the destination voice network and forwards a REL message to network interface control 32a. The network interface control 32b then passes an SVC release request to the SVC selector 24 which consults the communications application policy to determine whether caching is used by the communications application 22. It is determined that caching is used, so the SVC selector 24 passes selection index data extracted from the REL message to the caching manager 28 which uses the data to search a cache table 30 for the communications application for the VCCI=X1. The cache manager 28 locates an entry for VCCI=X1 and changes the status of the VCCI to indicate that the VCCI is unoccupied. The cache manager 28 then searches the table to determine the number of currently unoccupied VCCIs. It then executes the caching algorithm for the communications application 22 to determine whether the released SVC should be kept in the cache table or released back to the network. In this example, the caching manager 28 determines that the released SVC should be maintained in the cache table.

The caching algorithm indicates, however, that the local cross-connect should be released in order to improve efficiency of SVC utilization. The caching manager 28 informs the SVC control agent 26 that the local cross-connect should be released. The SVC control agent 26 instructs the switch control element 32b to release the local cross-connect but maintain the SVC between the auxiliary line card 18b and the auxiliary line card 18a. On receipt of the REL message, the network interface control 32a passes an SVC release request to the local SVC selector 24 which executes the same procedures described above resulting in the release of the local cross-connect for the VCCI X1. The network interface control 32a concurrently sends a release to the originating switched telephone network followed by a Release Complete (RLC) in accordance with the requirements of SS7 protocol.

EXAMPLE 2

FIG. 4 shows an example of a similar voice over ATM transmission in which the caching manager 28 determines that the VCCI X1 should be deleted from the cache tables for communications application 22. Call setup and cell transfer proceed identically to the call setup and cell transfer described above in Example 1. However, on receipt of the REL message from the destination switched telephone network, the caching manager 28, after executing its caching algorithm for the communications application 22, determines that the SVC should not be maintained in the caching tables and that the network resources reserved by the SVC should be released for use by another application. The caching manager 28 therefore deletes the entry for the VCCI=X1 from the cache table and instructs the SVC control agent 26 to release the VCCI X1 back to the network. The SVC control agent therefore instructs the switch control element 20b to release the VCCI X1. The switch control element 20b propagates a message back to the ATM network to its peer switch control element 20a to release the VCCI X1. It also confirms the release back to the network interface control 32. On receipt of the release message at switch control element 20a, the switch control element 20a releases the local cross-connect and informs the network interface control 32a that the VCCI X1 has been released. The network interface control 32a passes the release message to the caching manager 28 which locates the cache table entry for VCCI X1 and deletes the entry from its cache table. Concurrently, the network interface control 32a forwards an REL message to the originating switched telephone network.

EXAMPLE 3

FIG. 5 shows two examples of an ATM network 12 used to transport Internet Protocol traffic. In implementing IP over ATM networks, the application interfaces 14a,b are typically hosts or routers equipped with ATM Network Interface Cards (NICs), commonly referred to as "IP edge devices". Several protocols are available for transporting IP traffic over ATM networks. For example, Multi-Protocol Over ATM (MPOA) or Multi-Protocol Label Switching (MPLS) can be used. In a typical scenario, when an IP application interface 14a receives an IP packet, its associated network interface control 32a checks to determine if it has a shortcut SVC for the packet through the ATM network to a peer application interface 14b. If the associated network interface control 32a determines that a shortcut exists, it passes a communication request to the local SVC selector 24. The SVC selector 24 searches a cache table for the IP application. The cache table may, for example, have a structure similar to that shown in Table 4.

TABLE 4

| IP destination address prefix | Status | Orig. interface address | Dest. ATM address | Outgoing port VPI/VCI | Encapsulation info. | Service Characteristics |
|---|---|---|---|---|---|---|
| 47.2.6.00 | available | address X | Y1 | a/0/110 | — | UBR OC3 |
| 47.2.6.00 | token required | address X | Y1 | a/0/121 | — | VBR DS3 |
| 47.2.15.00 | occupied | address X | Y2 | b/1/200 | — | CBR DS3 |

In searching the cache table shown in FIG. 4, the SVC selector examines the status information relating to the SVC to determine whether the SVC is available and, if so, what if any actions must be taken before cells can be transmitted over the link. The status value is preferably implemented in order to prevent congestion and cell loss in the ATM network. Since IP traffic is connectionless, IP cells today are sent over any SVC which has an unspecified Bit Rate (UBR).

To improve the quality of service, however, more intelligent methods can be used. For example, cell loss can be minimized if a status value is checked before a packet is sent in order to ensure that an SVC has adequate capacity and is not occupied by a real-time IP application.

To ensure adequate capacity, a token system can be used for certain SVCs. Using the token system, a token register is maintained for each SVC having a status of "token required". The token register is credited by the caching manager 28 on a periodic basis with a predefined number of tokens. The predefined number of tokens is set by a network operator and is dependent on the capacity of the links in the SVC. Each time a group of cells are sent, tokens are subtracted from the token register by the SVC selector 24 in accordance with an appropriate algorithm. If the SVC selector 24 wishes to send cells on the SVC it must first examine the token register to ensure that adequate tokens are available. If adequate tokens are not available, an alternate SVC must be selected or a new SVC must be set up in order to carry the IP packets. Before cells are sent to the ATM network 12, the IP packets are encapsulated in accordance with encapsulation information retrieved from the SVC caching table 4, and the packets assembled into ATM cells.

In accordance with the more intelligent methods for routing IP packets, an SVC can also be reserved for the exclusive use of a particular IP communications session. For example, see row 3 of Table 4 which indicates that the Outgoing Port VIP/VCI "b/1/200" is "occupied". The SVC is occupied because it is exclusively used by a video conference session, for example. The video conference session is an exchange of IP packets between a specific originating and one or more specific terminating addresses. When IP protocols support such services with a QOS guarantee, SVC setup and maintenance will be available to provide them. When an SVC has a status of occupied, the SVC selector 24 cannot use the SVC.

In the example shown in the lower half of FIG. 5, when an IP packet is received at the application interface 14a and the network interface control 32a determines that there is a shortcut for the packet through the ATM network 12, it passes a communications request to the local SVC selector 24. The communications request includes selection index information that is received by the SVC selector 24 which consults the SVC cache table 30 shown in Table 4. The SVC selector 24 determines that there is an SVC Y2 available but that the token register does not contain enough tokens to permit the IP packet to be sent over the SVC at this time. The SVC selector 24 therefore instructs the SVC control agent 26 to set up a new SVC to carry the IP traffic. The SVC control agent 26 instructs the switch control element 20a to set up the required SVC. The switch control element 20a sends an ATM signaling message through the ATM network 12 to switch control element 20b requesting the SVC setup. The switch control element 20b downloads the required cross-connect information to the ATM switch fabric 16b and the auxiliary cross-connect line card 18b and returns an acknowledge (ACK) message to the switch control element 20a. Switch control element passes on a connect message indicating that the new SVC has been successfully set up. On receipt of the connect message, the selector 24 consults its application policy information to determine whether the IP application uses caching. The SVC selector 24 determines that the IP application uses SVC caching and therefore informs the caching manager 28 that a new SVC has been set up for the IP application. The caching manager executes the caching algorithm for the application and determines that the new SVC should be added to the caching table shown in Table 4. Thereafter, two SVCs are available to the IP application until the caching algorithm for the application indicates that the second SVC should be deleted from the caching table and the resources returned to the ATM network 12.

Cross-Connect Caching

Figure 6:
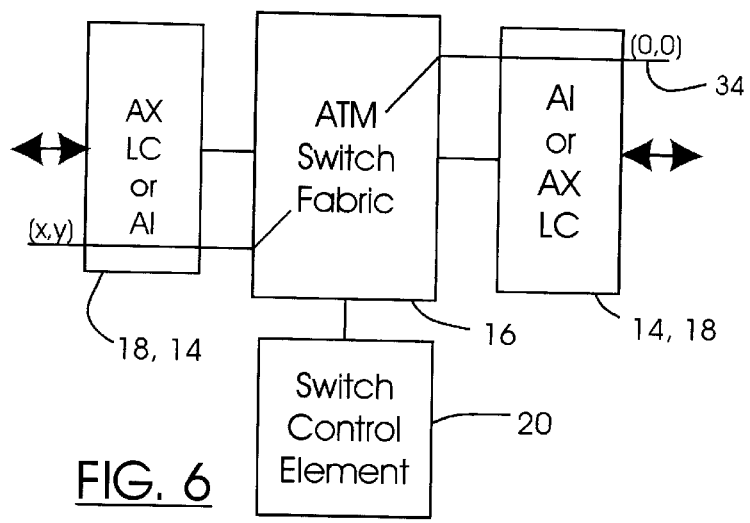
FIG. 6 is a schematic diagram of a cached cross-connection in an ATM switch.

It will be understood by those skilled in the art that the methods and apparatus in accordance with the invention can be used for caching cross-connections (XCs) through an ATM switch, as well as for caching SVCs through an ATM network. FIG. 6 shows a schematic diagram of an XC 34 which cross-connects input port (0,0) with output port (X,Y). The input port (0,0) may be a port on an application interface 14 or an auxiliary line card 18. The output port (X,Y) may likewise be a port on an auxiliary line card 18 or an application interface 14, depending on the configuration of the ATM switch. As well, both the input port (0,0) and the output port (X,Y) may be ports on auxiliary line cards 18. By caching XCs in the nodes of an ATM network, SVC setup through the network can be much more quickly accomplished.

Figure 7:
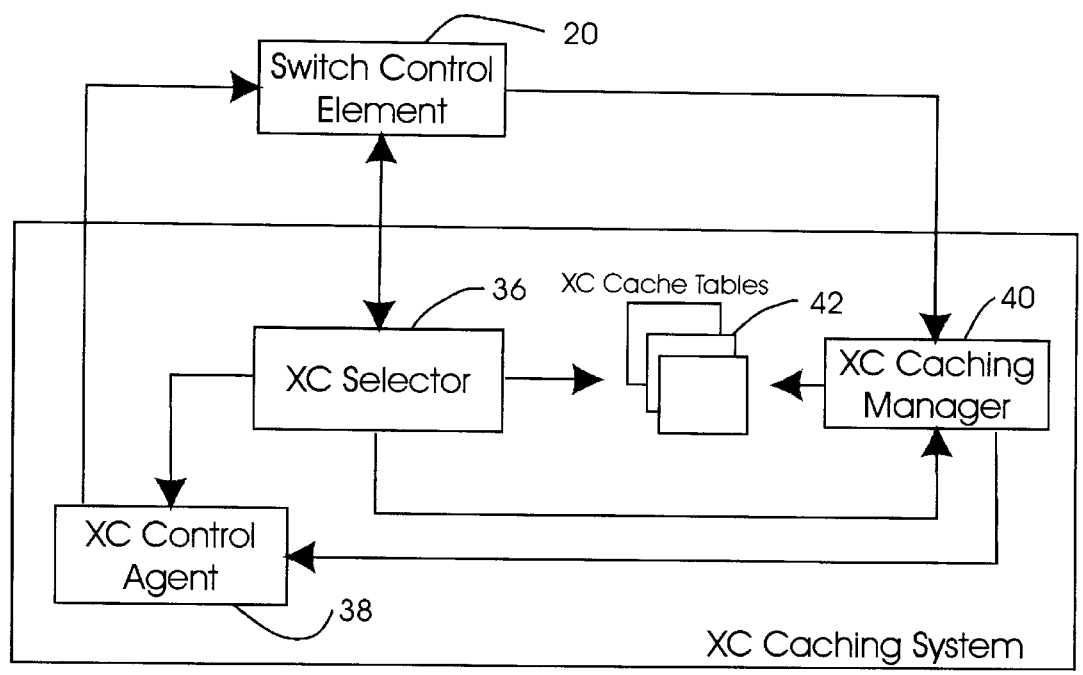
FIG. 7 is a schematic diagram of an XC caching system in accordance with the invention.

FIG. 7 shows a schematic diagram of an XC caching system in accordance with the invention. The caching components and algorithms described above may be used substantially without modification to enable XC caching at an ATM network node. If XC caching is enabled, the XC selector 36, the XC control agent 38, the XC caching manager 40 and the XC cache tables 42 are preferably enabled on the switch control element 20 in order to ensure maximum caching speed. In very fast ATM switch implementations, it may be advantageous to enable the functions of the XC selector 36, the XC control agent 58 and the XC caching manager 40 in firmware, when practical, in order to ensure that XC cache processing executes as quickly as possible. For the sake of efficiency, it may also be desirable to provide an XC selector 36, an XC control agent 38 and an XC caching manager 40 for each class of service for which cached XCs are provided.

In order to rapidly establish a cross-connection through an ATM switch, XCs are set up in accordance with the initialization process described above for SVCs. The setup may be accomplished by network administration or may be permitted to proceed in accordance with an XC caching algorithm for the ATM switch. After XCs are established for the switch and cached, those XCs are available for selection by the XC selector 36 when a new SVC must be set up through the network. If a cached XC is available in the switch when an SVC request is received by the switch control element 20, cross-connect processing is minimized and SVC setup through the network is rapidly accomplished.

The invention therefore provides a new switch architecture in which cross-connections are rapidly effected. The XC control agent 38 is responsible for XC setup and release in the ATM switch. The XC control agent 38 has the same functionality as the SVC control agent 26 described above. The XC caching manager 40 maintains the XC cache tables 42 in which a record of each cached XC is stored. The XC caching manager 40 has the same functionality as the SVC caching manager 28 described above. The XC selector 36 processes operation requests that seek to establish an XC through the ATM switch, or release an XC that is no longer required. The XC selector 36 selects an available cached XC from the XC cache tables 42, requests the XC control agent 38 to establish a new XC through the switch when a process operation request is received. The XC selector 36 has all of the functionality of the SVC selector 24 described above.

It will be understood by those skilled in the art that the use of the invention is not limited to the examples described above. It should also be understood by those in the art that Switched Virtual Circuits and Switch Cross-Connections may be cached in other ways besides the specific examples of the preferred embodiment described above. Changes and modifications to the embodiments described may become apparent to those skilled in the art. The scope of the invention is therefore intended to be limited solely by the scope of the appended claims.

We claim:

1. A method of rapidly establishing a communications connection through an asynchronous transfer mode (ATM) network, comprising the steps of:
   a) setting up from one of a first and second ingress/egress points in the ATM network at least one switched virtual circuit connection (SVC) between the first and second ingress/egress points;
   b) caching the at least one SVC at the respective first and second ingress/egress points for use by either the first or second ingress/egress point when a request for a communications connection through the ATM network is received by a respective one of the ingress/egress points;
   c) selecting at the respective one of the first and second ingress/egress points an appropriate one of the at least one cached SVC when the request for a convocations connection through the ATM network is received by the respective one of the first and second ingress/egress point, if an appropriate cached SVC is available;
   d) using the selected SVC to rapidly establish the communications connection through the ATM network; and
   e) when the communications connection is released, executing a caching algorithm at each of the respective fist and second ingress/egress points to determine whether the SVC should be released or returned to the SVC cache.

2. A method of rapidly establishing a communications connection through an ATM network as claimed in claim 1 wherein the caching algorithm is executed by an SVC caching manager, an SVC selector serves as an in trace between communications applications ad an SVC control agent, and the SVC control agent effects SVC setup and release.

3. A method of rapidly establishing a communications connection through an ATM network as claimed in claim 2 wherein either one of the SVC caching manager and the SVC selector can request that the SVC control agent perform an SVC setup or release.

4. A method of rapidly establishing a communications connection through an ATM network as claimed in claim 2 wherein the SVC caching manager maintains a cache table that stores a record of each cached SVC and its current status.

5. A method of rapidly establishing a communications connection through an ATM network as claimed in claim 2 wherein the SVC selector receives SVC operation requests from communications applications wishing to setup or release communications connections through the ATM network and interacts with the SVC control agent and the SVC caching manager to effect the requests.

6. A method of rapidly establishing a communications connection through an ATM network as claimed in claim 5 wherein the SVC selector consults a rule base to obtain rules respecting how SVC operation requests are to be responded to when the operation requests are received from a communications application.

7. A method of rapidly establishing a communications connection through an ATM network as claimed in claim 6 wherein the rule base is a communications application-specific rule base.

8. A method of rapidly establishing a communications connection through an ATM network as claimed in claim 7 wherein the rule base includes a rule that indicates whether the communications application uses cached SVCs in completing communications connections and the SVC selector consults the cache table to search for an unoccupied cached SVC for the communications connection only if the communications aplcatique uses cached SVCs.

9. A method of rapidly establishing a communications connection through an ATM network as claimed in claim 1 wherein the communications connection is used for a synchronous transfer mode (STM) voice call routed from an STM switched telephone network.

10. A method of rapidly establishing a communications connection through an ATM network as claimed in claim 8 wherein a record of the at least one cached SVC is stored in a table of cached SVCs, the table indicating an occupation status of each cached SVC.

11. A method of rapidly establishing a communications connection through an ATM network as claimed in claim 1 wherein the communications connection is used for Internet Protocol (IP) packets routed from an IP network.

12. A method of rapidly establishing a communications connection through an ATM network as claimed in claim 11 wherein the IP packets are routed on an SVC having a service characteristic of unspecified bit rate (UBR).

13. A method of rapidly establishing a communications connection through an ATM network as claimed in claim 11 wherein the IP packets are routed on the SVC using a token register and IP packets cannot be transmitted on an SVC unless there are adequate tokens in a token register associated with the SVC to ensure that the SVC can accommodate all ATM cells associated with the packets.

14. A method of rapidly establishing a communications connection through an ATM network as claimed in claim 11 wherein the IP packets are associated with a specific originating IP address and one or more specific terminating IP addresses and the SVC is reserved for exclusive use by IP packets transmitted between the specific originating and terminating IP addresses.

15. A method of rapidly establishing a communications connection through an ATM network as claimed in claim 2 wherein the SVC selector receives selection index data with each request for a communications connection through the ATM network and the selection index data permits the SVC selector to search a cache table for an appropriate cached SVC.

16. A method of rapidly establishing a communications connection through an ATM network as claimed in claim 2 wherein the SVC selector receives a request for a communications connection and the SVC selector extracts information from the request and converts the information into selection index data used to search a cache table for an appropriate cached SVC.

17. A method of rapidly establishing a communications connection through an ATM network as claimed in claim 4 wherein the caching manager communicates with a peer caching manager at an opposite end of an SVC connection through the network each time an SVC is added to, or deleted from, the cache table, unless the SVC is added to, or deleted from, the cache table in response to a request from the peer caching manager.

18. A method of rapidly establishing a communications connection through an ATM network as claimed in claim 4 wherein each SVC setup through the network for a communications application is added to the cache tables of that communications application in order to ensure that peer caching tables at opposite ends of an SVC are synchronized without peer caching manager communications.

19. Apparatus for rapidly establishing a communications connection through an asynchronous transfer mode (ATM) network, comprising at least one machine programmed to perform the functions of:
   a) a switched virtual circuit connection (SVC) control agent which is responsible for SVC setup and release at an ingress/egress point in the ATM network;
   b) an SVC caching manager that maintains SVC cache tables in which a record of each cached SVC is stored; and
   c) an SVC selector that processes operation requests from a communications application that seeks to establish a connection through the ATM network, the SVC selector selects an available cached SVC from the SVC cache tables when an available cached SVC exists, and requests the SVC control agent to establish a new SVC through the ATM network if an available cached SVC does not exist, when a process operation request is received from the communications application.

20. Apparatus for rapidly establishing a communications connection through an ATM network as claimed in claim 19 wherein the SVC control agent, the SVC cache manager and the SVC selector are functions in a cache management program which executes on an ATM application interface.

21. Apparatus for rapidly establishing a communications connection through an ATM network as claimed in claim 19 wherein the SVC control agent, the SVC cache manager and the SVC selector are independent software modules which execute on an ATM application interface.

22. Apparatus for rapidly establishing a communications connection through an ATM network as claimed in claim 19 wherein the SVC control agent is an ATM switch fabric control element.

23. Apparatus for rapidly establishing a communications connection through an ATM network as claimed in claim 19 wherein the SVC selector and the SVC cache manager are executable code that reside on a network interface control separate from any application interfaces connected to the ATM switch fabric.

24. A computer readable memory containing executable instructions for performing the functions of:
   a) a switched virtual circuit connection (SVC) control agent which is responsible for SVC setup and release at an ingress/egress point in an ATM network;
   b) an SVC caching manager that maintains SVC cache tables in which a record of each cached SVC is stored; and
   c) an SVC selector that processes operation requests from a communications application that seeks to establish a communications connection through the ATM network, the SVC selector selecting an available cached SVC from the SVC cache tables if an available cached SVC exists, and requesting the SVC control agent to establish a new SVC through the network if an available cached SVC does not exist, when a process operation request is received from the communications application.

25. A method of rapidly establishing a cross-connection through an asynchronous transfer mode (ATM) switch, comprising the steps of:
   a) setting up at least one cross-connection (XC) between an ingress port and an egress port in the ATM switch;
   b) caching the at least one XC for use by the ingress port when a request for a cross-connection through the ATM switch is received;
   c) selecting a one of the at least one cached XCs when the request for a cross-connection through the ATM switch is received;
   d) using the selected XC to rapidly establish the cross-connection trough the ATM switch; and
   e) when the communications connection is released, executing a caching algorithm at the ATM switch to determine whether the XC should be cached or released.

26. Apparatus for rapidly establishing a cross-connection through an asynchronous transfer mode (ATM) switch, comprising an ATM switch control element programmed to perform the functions of:
   a) a cross-connect (XC) control agent that is responsible for XC set up and release in the ATM switch;
   b) a cross-connect caching manager that maintains an XC cache table in which a record of each cached XC is stored; and
   c) a cross-connect selector that processes operation requests for establishing an XC through the ATM switch, or releasing an XC that is no longer required, the cross-connect selector selecting an available cached XC from the XC cache table if an available cached XC exists, and requesting the cross-connect control agent to establish a new XC through the switch if an available cached XC does not exist, when a process operation request is received.

27. A computer readable memory containing executable instructions for performing the functions of:
   a) setting up at least one cross-connection (XC) between an ingress port and an egress port in the ATM switch;
   b) caching the at least one XC for use by the ingress port when a request for a communications connection through the ATM switch is received;
   c) selecting a one of the at least one cached XCs when the request for a cross-connection through the AIM switch is received;
   d) using the selected XC to rapidly establish the cross-connection through the ATM switch; and
   e) when the communications connection is released, executing an XC caching algorithm to determine whether the XC should be cached or released.

28. A computer readable memory containing executable instructions for performing the functions of:
   a) a cross-connect (XC) control agent that is responsible for XC set up and release in the ATM switch;
   b) a cross-connect caching manager that maintains an XC cache table in which a record of each cached XC is stored; and
   c) a cross-connect selector that processes operation requests for establishing an XC through the ATM switch, or releasing an XC that is no longer required, the cross-connect selector selecting an available cached XC from the XC cache table if an available XC exists, and retesting the cross-connect control agent to establish a new XC through the switch if an available XC does not exist, when a process operation request is received.

* * * * *

UNITED STATES PATENT AND TRADEMARK OFFICE
CERTIFICATE OF CORRECTION

PATENT NO.    : 6,275,493 B1  
DATED         : August 14, 2001  
INVENTOR(S)   : Todd D. Morris et al.

Page 1 of 1

It is certified that error appears in the above-identified patent and that said Letters Patent is hereby corrected as shown below:

Column 8,  
Line 40, "Happlications" is corrected to -- applications --;

Column 15, claim 1c,  
Line 36, "convocations" is corrected to -- communications --;  
Line 39, "point, if" is corrected to -- points if --';

Column 15, claim 1e,  
Line 44, "fist" is corrected to -- first --;

Column 15, claim 2,  
Line 50, "in trace" is corrected to -- interface --;  
Line 51, "ad" is corrected to -- and --;

Column 16, claim 8,  
Line 21, "aplcatique" is corrected to -- application --; and Column 18, claim 28c,  
Line 62, "retesting" is corrected to -- requesting --.

Signed and Sealed this

Twelfth Day of March, 2002

Attest:

*Attesting Officer*

JAMES E. ROGAN  
*Director of the United States Patent and Trademark Office*